(12) United States Patent
Wittebrood et al.

(10) Patent No.: US 6,800,244 B2
(45) Date of Patent: Oct. 5, 2004

(54) ALUMINUM BRAZING ALLOY

(75) Inventors: Adrianus Jacobus Wittebrood, Velserbroek (NL); Achim Bürger, Hoehr-Grenzhausen (DE); Klaus Vieregge, Nauort (DE); Job Anthonius Van Der Hoeven, Haarlem (NL); Scott W. Haller, Richmond, VA (US)

(73) Assignees: Corus L.P., Quebec (CA); Corus Aluminium Walzprodukte GmbH, Koblenz (DE)

( * ) Notice: Subject to any disclaimer, the term of this patent is extended or adjusted under 35 U.S.C. 154(b) by 0 days.

(21) Appl. No.: 10/141,133

(22) Filed: May 9, 2002

(65) Prior Publication Data

US 2003/0086812 A1 May 8, 2003

Related U.S. Application Data

(63) Continuation-in-part of application No. 09/713,297, filed on Nov. 16, 2000.
(60) Provisional application No. 60/221,959, filed on Jul. 31, 2000.

(30) Foreign Application Priority Data

Nov. 17, 1999 (EP) .............................. 99203824

(51) Int. Cl.$^7$ .............................. C22C 21/00
(52) U.S. Cl. .................. 420/537; 420/531; 420/553
(58) Field of Search ................. 420/532, 535, 420/553, 548, 531, 537

(56) References Cited

U.S. PATENT DOCUMENTS

| | | | | |
|---|---|---|---|---|
| 4,571,368 A | * | 2/1986 | Fenoglio et al. ....... | 204/196.22 |
| 6,610,247 B2 | | 8/2003 | Wittebrood et al. | |

FOREIGN PATENT DOCUMENTS

| | | | |
|---|---|---|---|
| EP | 0637481 | 2/1995 | |
| GB | 2321869 | 8/1998 | |
| JP | 57131339 A | * 8/1982 | ........... C22C/21/00 |
| JP | 57169054 A | * 10/1982 | ........... C22C/21/00 |
| JP | 59085837 | 5/1984 | |
| JP | 1195263 | 8/1989 | |
| JP | 3134127 | 6/1991 | |
| JP | 3134128 | 6/1991 | |
| JP | 6306519 | 11/1994 | |
| JP | 07090444 | 4/1995 | |
| WO | 9718946 | 5/1997 | |

OTHER PUBLICATIONS

"Metals Handbook: Desk Edition", $2^{nd}$ edition, Davis, J. R., ASM International, (1998), pp 445–448.*

"ASM Specialty Handbook: Aluminum and Aluminum Alloys", ASM International, 1993, pp. 420–437.*

Althoff, J., "Aluminum alloy 3009; high strength without magnesium", Light Met. Age (1980), 38 (11–12), 20–1, XP002134979.

Althoff, J. et al, "Properties and use of a new aluminum–manganese–silicon alloy" Metall (Berlin)(1979), 33(6), 589–2.

van der Hoeven, J. et al, "Development of a High Strength Fin Stock Aluminum Alloy", SAE Paper No. 2001–01–1735, The Proceedings of the 2001 Vehicle Thermal Management System Conference (P–363), pp. 1–5 (2001).

US Patent Appln. Pub. No. 2003/0155409, (Ser. No. 10/300, 836) Dockus et al., filed Nov. 21, 2002, Published Aug. 21, 2003.

US Patent Appln. Pub. No. 2003/0189082, (Ser. No. 10/300, 837) Dockus et al., filed Nov. 21, 2002, Published Oct. 9, 2003.

US Patent Appln. Pub. No. 2003/0098338, (Ser. No. 09/990, 507) Dockus et al., filed Nov. 21, 2001, Published May 29, 2003.

Fasching, Audrey A., et al., "Challenges for Aluminum in the Brazed Automotive Heat Exchanger Market", Alumitech 97, Proceedings of the $2^{nd}$ International Aluminum Conference and Trade Exposition, Atlanta, Georgia, USA, May 22–23 1997, pp. 180–187.

* cited by examiner

*Primary Examiner*—George Wyszomierski
*Assistant Examiner*—Janelle Morillo
(74) *Attorney, Agent, or Firm*—Stevens, Davis, Miller & Mosher, LLP

(57) ABSTRACT

The invention relates to an aluminium brazing alloy, ideally suitable as fin stock material, having a composition, in weight %: Si 0.7–1.2, Mn 0.7–1.2, Mg up to 0.35, Fe up to 0.8, Zn up to 3.0, Ni up to 0.005, Cu up to 0.5, optionally one or more members selected from the group comprising Ti up to 0.20, In up to 0.20, Zr up to 0.25, V up to 0.25, and Cr up to 0.25, others up to 0.05 each and up to 0.15 in total, and an Al balance.

45 Claims, No Drawings

ALUMINUM BRAZING ALLOY

CROSS REFERENCE TO RELATED APPLICATION

This application claims priority from U.S. provisional application serial No. 60/221,959, filed Jul. 31, 2000, and is a continuation-in-part of U.S. patent application Ser. No. 09/713,297, filed Nov. 16, 2000, both incorporated herein by reference.

FIELD OF THE INVENTION

The invention relates to an aluminium alloy, which alloy can be used for heat exchangers. Ideally the aluminium alloy according to the invention is provided as fin stock material for heat exchanger devices. Furthermore, the invention relates a brazed assembly in the form of a brazed heat exchanger comprising at least one component of the aluminium alloy according to this invention.

DESCRIPTION OF THE RELATED ART

In the prior art, aluminium alloys are the alloys of choice for heat exchanger applications. These alloys are selected for their desirable combination of strength, low weight, good thermal and electrical conductivity, brazeability, corrosion resistance, and formability.

An aluminium alloy heat exchangers can be fabricated by stacking aluminium alloy clad sheets (brazing sheet), which have been formed to a desired configuration, so as to form fluid passages (tubes) and securing corrugated aluminium alloy fins between fluid passages by brazing. The bonding between the alloy clad sheets or the tube material and fins is achieved by melting the brazing filler metal of the core plates and/or fin material. As a brazing method, typically vacuum brazing or flux brazing is being applied. In an effort to improve the corrosion resistance of the fluid passage materials, some fin materials may be used which are electrochemically anodic (less noble) relative to the fluid passage material by the sacrificial anode effect of these fin materials.

Some disclosures of aluminium brazing sheet alloys found in the prior art literature will be mentioned below.

The publication by J. Althoff, in the technical journal Light Metal Age, December, 1980, pp. 20–21, "Aluminium Alloy 3009: High Strength Without Magnesium", discloses the 3009 alloy without magnesium. The 3009 alloy has the following composition, in weight percent:

| | |
|---|---|
| Si | 1.0–1.8 |
| Fe | max. 0.7 |
| Cu | max. 0.10 |
| Mn | 1.2–1.8 |
| Mg | max. 0.01 |
| Cr | max. 0.05 |
| Ni | max. 0.05 |
| Zn | max. 0.05 |
| Zr | max. 0.10 |
| Ti | max. 0.10 | others each max. 0.05, total max. 0.15
balance aluminium,
and further has the proviso that Si:Fe should be 2:1 to 4:1, and that Mn+Si should be in the range of 2.5–3.5.
The disclosed alloy may replace the known AA3003 alloy, and may be used for brazing applications.

EP-A-0637481 (Furukawa) discloses an aluminium alloy brazing sheet having a three-layer structure clad one side of the core material with a brazing material and clad of the other side of the core material with a sacrificial material. The defined core material has a very wide compositional window, in weight percent:

| | |
|---|---|
| Si | 0.6–2.5 |
| Cu | 0.5–2.5 |
| Mn | up to 2.0 | at least one kind selected from the group consisting of:

| | |
|---|---|
| Mg | 0.03–0.5 |
| Cr | 0.03–0.3 |
| Zr | 0.03–0.3 |
| Ti | 0.03–0.3 |
| Ni | 0.03–1.5 | balance aluminium and impurities.

This document further discloses an aluminium alloy brazing sheet having a three-layer structure cladded on both sides of the core material with a brazing material and whereby the core material has a very wide compositional window, in weight percent:

| | |
|---|---|
| Si | 0.03–2.5 |
| Fe | 0.05–2.0 |
| Cu | 0.05–2.0 |
| Mn | 0.6–2.0 | at least one kind selected from the group consisting of:

| | |
|---|---|
| Zn | 0.05–5.0 |
| In | 0.002–0.3 |
| Sn | 0.002–0.3 | balance aluminium and inevitable impurities.

There is a market demand in the automotive industry for aluminium alloys which may be used for application in heat exchangers, which alloys have improved post-brazed strength in combination with a good corrosion resistance. Further, there is a demand from the side of the manufacturers of such aluminium alloys, for alloys having a tolerance for impurity elements from a recycling point of view without compromising to the required properties of such an aluminium alloy.

SUMMARY OF THE INVENTION

It is an object of the present invention to provide an aluminium alloys which can be used for heat exchangers having an improved post-braze 0.2% yield strength over conventional alloys for the same application. It is another object of the present invention to provide an aluminium alloy having an improved tolerance for impurity elements. It is a further object of the present invention to provide an aluminium alloy which is ideally suitable for providing fin stock material for heat exchanger devices.

In one aspect the invention provides an aluminium alloy having the composition, in weight percent:

| | |
|---|---|
| Si | 0.7–1.2 |
| Mn | 0.7–1.2 |
| Mg | up to 0.35 |
| Fe | up to 0.8 |
| Zn | up to 3.0 |
| Ni | up to 0.005 |
| Cu | up to 0.5 |
| Ti | up to 0.20 |
| In | up to 0.2 |
| Zr | up to 0.25 |
| V | up to 0.25 |
| Cr | up to 0.25 | others up to 0.05 each, up to 0.15 in total
Al balance.

This aluminium alloy has a good corrosion resistance, which includes the sacrificial anode effect where required, in combination with good mechanical properties in the post-brazing state and is capable of providing an increase in post-braze 0.2% yield strength (PS) of at least 15% over conventional finstock alloys, such as AA3003 in the same temper. The aluminium alloy in accordance with the invention is capable of achieving a post-braze 0.2% yield strength (PS) of at least 60 MPa, and in the best examples of at least 65 MPa and even as a high as 70 MPa or more.

Although this aluminium alloy can be used for tube plate, side supports and header tanks in heat exchanger units, and may have other uses, it is primarily intended as a rolled finstock alloy for heat exchangers. The corrosion demand for finstock is such that if the heat exchanger unit is attacked by corrosion, the fin material is preferentially attacked and not the tube material. The aluminium alloy according to this invention has this sacrificial anode effect. The aluminium alloy can be stronger, so the rolled finstock can be thinner and lighter than conventional finstock alloys, such as AA3003 alloys. The aluminium alloy of the invention used as finstock material may be used in combination with a cladding of a brazing alloy, e.g. an Al—Si alloy known in the art or other similar Al—Si systems alloys, such as Al—Si—Mg alloy, Al—Si—Mg—Bi alloy, Al—Si—Bi alloy or the like.

The heat exchanger market, particularly in the automotive industry, requires that finstock alloys offer a balance of properties, i.e. strength, formability, brazeability and corrosion potential. A key feature of the novel alloy of this invention is the relatively high Si content as compared to AA3003 alloys, in combination with a medium Mn content. Consequently this increases the post-braze strength, by more than 15% relative to conventional finstock alloys. The alloy exhibits amongst others excellent brazeability properties.

The reasons for the limitations of the alloying and other elements of the aluminium alloy according to the present invention are described below. All composition percentages are by weight.

Si is an important alloying element in the alloy according to this invention. The addition of Si results in an increased solution hardening of the alloy. Below 0.7% there is only little effect of the Si, and above 1.2% it may result in the formation of detrimental low-melting eutectics and also in the formation of large intermetallic particles. A more suitable range for the Si content is 0.75 to 1.0%, and more preferably in the range of 0.80 to 1.0%. In many aluminium alloys a Si-level at a medium range is other regarded as detrimental. An advantage of this medium range Si-content is that the alloy has a tolerance for impurity elements, and allows this alloy to be composed from large amounts of scrap material. Preferably the sum of Si+Mn is in the range of 1.6–2.3, and more preferably in the range of 1.75–2.1, and most preferably in the range of 1.8–2.05, and allows for a good compromise in desired properties of the aluminium alloy such as post-braze strength and sag-resistance, while the aluminium alloy can be manufactured without great difficulties from scrap material.

Mn is also an important alloying element in the alloy according to this invention. The addition of Mn in a medium range of 0.7 to 1.2%, A more preferred lower limit for the Mn content is 0.8%. A more preferred upper limit for the Mn content is 1.1%. And more preferably the Mn should be in the range of 0.8 to 1.0%. A very high Mn content might lead to the detrimental formation of large Fe—Mn intermetallics. To allow for the alloy to be composed of large amounts of scrap, which might contain relatively high Fe contents, the Mn level should not exceed 1.2%. Above 1.2% Mn the casting of an ingot becomes more difficult.

Mg increases the strength of the alloy significantly, but has a detrimental influence on controlled atmosphere brazeability because it tends to interact with the flux applied. For this reason the Mg content is restricted to a maximum of 0.35%, and a more preferred range for the Mg level is 0.1 to 0.35%, and even more preferably in the range of 0.2 to 0.35%, as a compromise in post-braze strength and brazeability. However, in the embodiment where the alloy according to the invention is being used is a flux brazing process, such as the NOCOLOK brazing, the Mg is not added deliberately to the aluminium alloy in order to improve the brazeability. The maximum for Mg-level is then 0.10%, and a preferred maximum is 0.03%, and more preferably the Mg content is less than 0.01%.

Fe is present in all known aluminium alloys. With a too high Fe content among other things the formability of the material decreases and also the corrosion performance is decreasing. The admissible Fe content is 0.8% maximum, and preferably 0.5% maximum. Such relatively high Fe contents may be tolerated by limiting the Mn content. A suitable Fe content is in the range of 0.20 to 0.45%, and allows for a good compromise in desired properties of the alloy such as post-braze strength and sag-resistance, while the alloy can be manufactured without great difficulties from scrap material.

The addition of Zn leads to a more electronegative corrosion potential. To allow for the sacrificial anode effect, the fin material should be more electronegative as the tube material. Since different types of tube material can and will be used in heat exchangers, the Zn content can be used to tune the corrosion potential of the alloy of this invention to fit to the tube material. The Zn content should be at a level below 3.0% to avoid a too rapid corrosion attack of the fin material. Since Zn may be tolerated up to 3.0%, and preferably up to 2.0%, and more preferably up to 1.5%, and most preferably up to 1.0%, this achieves an advantage in the tolerance of this alloy for impurity elements, and allows this alloy to be composed from large amounts of scrap material, such as discarded heat exchangers, but not limited to this example. A suitable lower limit for the Zn-level is 0.2%.

An important aspect of the present invention is that the nickel content in the aluminium alloy does not exceed 0.005%, thereby achieving high post-braze strength properties and good corrosion resistance. Ni is not a common alloying element in commonly used aluminium alloy products, and undesirable accumulation thereof can be avoided by proper scrap management. For example, there may be less than 0.001% Ni or there may be an absence of Ni in the aluminium alloy.

Cu is preferably included as a strengthening component. Cu is believed not to reduce corrosion resistance in a way that has previously been reported. Since Cu may be tolerated up to 0.5%, this achieves an advantage in the tolerance of this aluminium alloy for impurity elements, and allows this alloy to be composed from large amounts of scrap material, such as discarded heat exchangers, but not limited to this example. A suitable maximum for the Cu content is up to 0.5%, and preferably up to 0.4%. A more preferred range for the Cu-level is 0.20 to 0.40% as a compromise in achieving post-braze strength, corrosion resistance and brazeability.

Ti may be present up to 0.20% to act as a grain refining additive during the casting of an ingot of the alloy of the invention. Additional Ti may be added, for example due to their presence in scrap material, in order to increase the strength of the alloy by solubility hardening. The total amount of Ti present in the alloy should not exceed 0.20%, but preferably is less than 0.15%.

The element Indium in a range of up to 0.2% may be added to the alloy of the invention in order to reach a more electro-negative corrosion potential. Furthermore, it has been found in accordance with the invention that in this aluminium alloy In is much more effective in reducing the corrosion potential of the alloy as compared to zinc additions. Typically 0.1% In is as effective as 2.5% Zn. When added as a deliberate alloying element a more preferred range for In is 0.01 to 0.10%.

Zr in a range of up to 0.25% may be added to the alloy of this invention in order to further improve the strength of the alloy in the post-braze condition. Further, this element may be tolerated as an impurity element without deteriorating the desired properties of the alloy. A more suitable Zr addition is in the range of 0.05 to 0.20, and more preferably in the range of 0.05 to 0.15%.

Cr in a range of up to 0.25% may be added to the alloy of this invention in order to further improve the strength of the alloy in the post-braze condition. In case Cr is added, a preferred range for this element is in the range of 0.01 to 0.17%, and more preferably in the range of 0.06 to 0.14%.

Other components including tin and vanadium may be tolerated in the alloy according to the invention in a range up to 0.25%, preferably up to 0.15%, and more preferably up to 0.05%, and most preferably up to 0.005%. The total of these elements should not exceed 0.30%, and preferably it should not exceed 0.15%. Optionally such element may be present to reduce the corrosion potential of the alloy, and V has further the potential of increasing post-braze strength.

The balance is made by aluminium and unavoidable impurities, typically each up to 0.05% maximum, and in total 0.15% maximum.

In another aspect of the invention there is provided in a brazed assembly, typically a heat exchanger, comprising the alloy of the invention as fin stock material. In such a heat exchanger having the alloy of the invention as fins, the fins may act as a sacrificial anode. The aluminium alloy according to the invention may also be clad on one or both of its surfaces. The purpose of such a cladding is essentially to provide the brazing material for the fillets, and is used for example in the case of unclad tubes like for condensers made from extruded tubes or for serpentine type evaporators. Typically each clad layer thickness is in the range of 2 to 15% of the total thickness of the clad product. The composition of the clad layer is typically in the range of 5 to 15% Si, optionally up to 2.0% Mg, optionally up to 3.0% Zn, and optionally up to 0.2% Bi.

The aluminium alloy in accordance with the invention will now be illustrated by non-limitative and comparative examples.

EXAMPLES

On a laboratory scale of testing six alloys have been cast with solidification rates in the same range as obtained with industrial scale DC casting. Although manufactured here on a laboratory scale of testing, the aluminium alloy in accordance with this invention can be manufactured using various standard industrial scale DC casting and continuous aluminium casting methods, followed by hot and/or cold rolling. The chemical compositions are listed in Table 1, where Alloys 1 to 4 are alloys according to the invention with Ti at grain refiner level, Alloy 5 and 6are alloys according to the invention with a somewhat increased Mg- and Ti-level, Alloy 6 further has an increased Zn-level. In all alloys according to the invention the Ni-, In-, and V-levels are at impurity level. Alloy 7 is the example in the H14 temper known from the international patent application WO-97/18946 for comparison reasons, and further an Alloy 8 has been used which is the known AA3003 alloy commercially used as finstock material. All aluminium alloys listed in Table 1 have a Ni-content of less than 0.001%. The four cast ingots were preheated and hot rolled to a thickness of 5.7 mm. The sheets were then cold rolled to 0.15 mm and annealed at 360–400° C. for 2 hours before cold rolling to a final gauge of 0.10 mm. This is commonly known as the H14 temper.

The cold rolled sheets had the following mechanical properties before and after being subjected to a simulated brazing cycle (approx. 5 min at 590° C. and air cool), see Table 2. The mechanical properties are valid for non-clad material. However, for certain applications the alloy of the invention may be provided with a thin cladding, resulting in a small decrease of the mechanical properties (both in the pre- and post-braze conditions) of a few MPa, typically about 2 to 10 MPa.

From these results it can be seen that the aluminium alloy of the invention has significant improvement in mechanical properties over the conventional used AA3003 alloy in the same temper, and offer the opportunity for down gauging of units prior to the brazing cycle and having a reduced rate of corrosion attack on the fin.

TABLE 1

Chemical composition, in weight percent, of the aluminium alloys tested, the balance is aluminium and unavoidable impurities.

| Alloy | Si | Mn | Mg | Fe | Zn | Cu | Zr | Cr | Ti |
|---|---|---|---|---|---|---|---|---|---|
| 1 | 0.9 | 1.1 | 0.1 | 0.3 | 0.4 | 0.3 | 0.08 | — | 0.01 |
| 2 | 0.9 | 1.05 | 0.1 | 0.3 | 0.4 | 0.3 | 0.09 | — | 0.01 |
| 3 | 0.9 | 1.1 | 0.1 | 0.3 | 0.4 | 0.3 | 0.08 | 0.09 | 0.01 |
| 4 | 0.9 | 0.95 | 0.1 | 0.3 | 0.4 | 0.3 | 0.09 | 0.01 | 0.01 |
| 5 | 0.97 | 0.9 | 0.3 | 0.3 | 0.2 | 0.25 | — | — | 0.15 |
| 6 | 0.97 | 1.1 | 0.3 | 0.3 | 1.0 | 0.25 | — | — | 0.15 |
| 7 | 0.9 | 1.3 | 0.1 | 0.4 | — | 0.3 | — | — | — |

TABLE 2

Mechanical properties before and after simulated brazing cycle.

| | Before brazing | | After brazing | |
|---|---|---|---|---|
| Alloy | 0.2 PS [MPa] | UTS [MPa] | 0.2 PS [MPa] | UTS [MPa] |
| 1 | 226 | 232 | 63 | 138 |
| 2 | 225 | 231 | 62 | 137 |
| 3 | 234 | 240 | 63 | 139 |

TABLE 2-continued

Mechanical properties before and after simulated brazing cycle.

|  | Before brazing | | After brazing | |
| --- | --- | --- | --- | --- |
| Alloy | 0.2 PS [MPa] | UTS [MPa] | 0.2 PS [MPa] | UTS [MPa] |
| 4 | 225 | 231 | 60 | 135 |
| 5 | 243 | 252 | 77 | 153 |
| 6 | 236 | 239 | 81 | 158 |
| 7 | — | — | 59 | 155 |
| 8 (AA3003) | 168 | 174 | 40 | 135 |

Having now fully described the invention, it will be apparent to one of ordinary skill in the art that many changes and modifications can be made without departing from the spirit or scope of the invention as herein described.

What is claimed is:

1. An aluminium alloy having the composition, in weight percent:

| | |
| --- | --- |
| Si | 0.7–1.2 |
| Mn | 0.8–1.0 |
| Mg | ≦0.35 |
| Fe | ≦0.8 |
| Zn | ≦3.0 |
| Ni | ≦0.005 |
| Cu | 0.25–0.5 |
| Ti | ≦0.20 |
| In | ≦0.2 |
| Zr | ≦0.25 |
| V | ≦0.25 |
| Sn | at most 0.25 |
| Cr | ≦0.25 | impurity elements ≦0.05 each, and ≦0.15 in total,
Al balance,
wherein the alloy is in the form of fin stock material.

2. The aluminium alloy according to claim 1, wherein the V-level is at most 0.15%.

3. The aluminium alloy according to claim 1, wherein the V-level is at most 0.05%.

4. The aluminium alloy according to claim 1, wherein the Si-level is in the range of 0.75 to 1.0%.

5. The aluminium alloy according to claim 1, wherein the Si-level is in the range of 0.80 to 1.0%.

6. The aluminium alloy according to claim 1, wherein the Zr-level is in the range of 0.05 to 0.15%.

7. The aluminium alloy according to claim 1, wherein the Fe-level is ≦0.5%.

8. The aluminium alloy according to claim 1, wherein the Fe-level is in the range of 0.20 to 0.45%.

9. The aluminium alloy according to claim 1, wherein the Cu-level is in the range of 0.25 to 0.40%.

10. The aluminium alloy according to claim 1, wherein the Ti-level is ≦0.15%.

11. The aluminium alloy according to claim 1, wherein the In-level is in the range of 0.01 to 0.10%.

12. The aluminium alloy according to claim 1, wherein the Mg-level is in the range of 0.1 to 0.35%.

13. The aluminium alloy according to claim 1, wherein the Mg-level is in the range of 0.2 to 0.35%.

14. The aluminium alloy according to claim 1, wherein the Mg-level is ≦0.10%.

15. The aluminium alloy according to claim 1, wherein the Zn-level is from 0.2 to 2.0%.

16. The aluminium alloy according to claim 1, wherein the Zn-level is from 0.2 to 1.5%.

17. The aluminium alloy according to claim 1, wherein the Zn-level is from 0.2 to 1.0%.

18. The aluminium alloy according to claim 1, wherein the sum of the Si-level and the Mn-level is from 1.6 to 2.3%.

19. The aluminium alloy according to claim 1, wherein the sum of the Si-level and the Mn-level is from 1.75 to 2.1%.

20. The aluminium alloy according to claim 1, wherein the sum of the Si-level and the Mn-level is from 1.8 to 2.05%.

21. The aluminium alloy according to claim 1, wherein the fin stock material is capable of obtaining a post-braze 0.2% yield strength of at least 60 MPa.

22. The aluminium alloy according to claim 1, wherein the fin stock material is capable of obtaining a post-braze 0.2% yield strength of at least 70 MPa.

23. The aluminium alloy according to claim 1, wherein the fin stock material is capable of obtaining a post-braze 0.2% yield strength in a range from 70 to 81 MPa.

24. A brazed heat exchanger having fins of the alloy according to claim 1.

25. A brazed heat exchanger having fins of the alloy according to claim 21.

26. A brazed heat exchanger having fins of the alloy according to claim 22.

27. A brazed heat exchanger having fins of the alloy according to claim 23.

28. The aluminium alloy according to claim 1, wherein the V-level is ≦0.005%.

29. The aluminium alloy according to claim 1, wherein the Sn-level is ≦0.15%.

30. The aluminium alloy according to claim 1, wherein the Sn-level is ≦0.05%.

31. The aluminium alloy according to claim 1, wherein the Sn-level is ≦0.005%.

32. The aluminium alloy according to claim 1, wherein a sum of the Sn-level and the V-level is ≦0.30%.

33. The aluminium alloy according to claim 1, wherein a sum of the Sn-level and the V-level is ≦0.15%.

34. The aluminium alloy according to claim 1, wherein the Ni-level is ≦0.001%.

35. A brazed heat exchanger having fins of an aluminium alloy having the composition, in weight percent,

| | |
| --- | --- |
| Si | 0.7–1.2 |
| Mn | 0.8–1.1 |
| Mg | ≦0.35 |
| Fe | ≦0.5 |
| Zn | ≦3.0 |
| Ni | ≦0.005 |
| Cu | 0.25–0.4 |
| Ti | ≦0.15 |
| In | ≦0.2 |
| Zr | ≦0.25 |
| V | ≦0.25 |
| SN | at most 0.25 |
| Cr | ≦0.25 | impurity elements ≦0.05 each, and ≦0.15 in total,
Al balance;
and wherein said alloy is in the form of fin stock and said fins have a post-braze 0.2% yield strength of at least 70 MPa.

36. The brazed heat exchanger of claim 35, wherein the Si-level is in the range of 0.75 to 1.0%.

37. The brazed heat exchanger of claim 35, wherein the Si-level is in the range of 0.80 to 1.0%.

38. The brazed heat exchanger of claim 35, wherein the V-level is at most 0.15%.

39. The brazed heat exchanger of claim 35, wherein the Fe-level is in the range of 0.20 to 0.45%.

40. The brazed heat exchanger of claim 35, wherein the In-level is in the range of 0.01 to 0.10%.

41. The brazed heat exchanger of claim 35, wherein the Mg-level is in the range of 0.1 to 0.35%.

42. The brazed heat exchanger of claim 35, wherein the Mg-level is in the range of ≦0.10%.

43. The brazed heat exchanger of claim 35, wherein the Zn-level is in the range of 0.2 to 2.0%.

44. A brazed heat exchanger having fins of an aluminium alloy consisting of, in weight percent,

| | |
|---|---|
| Si | 0.8–1.0 |
| Mn | 0.8–1.0 |
| Mg | ≦0.10 |
| Fe | ≦0.5 |
| Zn | ≦3.0 |
| Ni | ≦0.005 |
| Cu | 0.25–0.4 |
| Ti | ≦0.20 |
| In | ≦0.2 |
| Zr | ≦0.25 |
| V | ≦0.25 |
| Sn | at most 0.25 |
| Cr | ≦0.25 | impurity elements ≦0.05 each, and ≦0.15 in total,

Al balance;

and wherein said fins have a post-braze 0.2% yield strength of at least 70 MPa.

45. An aluminium alloy consisting of, in weight percent:

| | |
|---|---|
| Si | 0.7–1.2 |
| Mn | 0.7–1.2 |
| Mg | ≦0.35 |
| Fe | ≦0.8 |
| Zn | ≦3.0 |
| Ni | ≦0.005 |
| Cu | 0.25–0.5 |
| Ti | ≦0.20 |
| In | ≦0.2 |
| Zr | ≦0.25 |
| V | ≦0.25 |
| Sn | at most 0.25 |
| Cr | ≦0.25 | impurity elements ≦0.05 each, and ≦0.15 in total,

Al balance;

and wherein said alloy is in the form of fin stock material.

* * * * *